United States Patent
Arato et al.

(10) Patent No.: US 6,535,522 B1
(45) Date of Patent: Mar. 18, 2003

(54) MULTIPLE PROTOCOL INTERFACE AND METHOD FOR USE IN A COMMUNICATIONS SYSTEM

(75) Inventors: Lazslo Arato, Tinton Falls, NJ (US); William J. Santulli, Tinton Falls, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/164,886

(22) Filed: Oct. 1, 1998

Related U.S. Application Data

(60) Provisional application No. 60/060,651, filed on Oct. 1, 1997.

(51) Int. Cl.[7] ............................................. H04L 12/56
(52) U.S. Cl. .................................. 370/466; 370/395.1
(58) Field of Search ............................... 370/466, 467, 370/465, 463, 469, 391, 398, 422, 423, 359; 455/557; 340/2.21, 2.28, 2.24, 825.79, 825.8; 709/230, 249, 250; 710/129, 131, 38, 11, 105

(56) References Cited

U.S. PATENT DOCUMENTS

| | | | | |
|---|---|---|---|---|
| 4,878,058 | A | * 10/1989 | Needles | 341/101 |
| 5,490,252 | A | * 2/1996 | Macera et al. | 709/249 |
| 5,619,500 | A | * 4/1997 | Hiekali | 370/414 |
| 5,859,848 | A | * 1/1999 | Miura et al. | 370/395 |
| 5,961,626 | A | * 10/1999 | Harrison | 710/129 |
| 5,995,601 | A | * 11/1999 | Garland et al. | 379/106.03 |
| 6,163,531 | A | * 12/2000 | Kumar | 370/260 |
| 6,226,296 | B1 | * 5/2001 | Lindsey | 370/401 |
| 6,249,538 | B1 | * 6/2001 | Kothary | 370/466 |

OTHER PUBLICATIONS

Al Chamé, "Applications Information Interfacing the 68360 (QUICC) to T1/E1 Systems," Motorola Semi-conductor Technical Information, http://www.mot.com/netcom/docs/pubs/360toT1.html, Dec. 4, 1996.

"Communications Processor Module (CPM)," Motorola MC68360 Quad Integrated Communications Controller User's Manual, rev. 1, ch. 7, Dec. 4, 1996, pp. 7-1-7-381.

* cited by examiner

*Primary Examiner*—Ken Vanderpuye
(74) *Attorney, Agent, or Firm*—Thomas, Kayden, Horstemeyer & Risley

(57) ABSTRACT

A physical interface unit and method are disclosed which are configured to receive a data stream which may use any one of a number of data communications protocols, and to transmit the same data stream using another one of the same number of data communications protocols. The physical interface unit is advantageously designed to operate in conjunction with a processor circuit to translate a data stream from a first data protocol to a second data protocol. The physical interface unit includes a first serial interface, a first asynchronous transfer mode (ATM) interface, and a first parallel interface. The physical interface also includes a second serial interface, a second ATM interface, and a second parallel interface. The first serial, ATM, and parallel interfaces are electrically coupled to a first FIFO circuit which interfaces with the processor circuit. Likewise, the second serial, ATM, and parallel interfaces are electrically coupled to a second FIFO circuit which interfaces with the processor circuit. One of the first serial, ATM, and parallel interfaces and one of the second serial, ATM, and parallel interfaces are enabled by a selection circuit. A bi-directional data stream using a first protocol is received from and transmitted to a first data endpoint by the enabled first interface and provided to the processor circuit for protocol translation. The same data stream is transmitted to and received from a second data endpoint from the processor circuit via the enabled second interface.

7 Claims, 2 Drawing Sheets

MULTIPLE PROTOCOL INTERFACE AND METHOD FOR USE IN A COMMUNICATIONS SYSTEM

CROSS REFERENCE TO RELATED APPLICATIONS

This application claims the benefit of U.S. provisional patent application entitled "Programmable Framer for HDSL Transmissions" filed on Oct. 1, 1997 and afforded serial No. 60/060,651, the entire text of which is incorporated herein by reference.

STATEMENT REGARDING FEDERALLY SPONSORED RESEARCH OR DEVELOPMENT

Not Applicable.

TECHNICAL FIELD

The present invention relates to the field of data communications, and more particularly, to the field of protocol conversion in a communications system.

BACKGROUND INFORMATION

In data communications, data is generally transmitted in a serial communications format through current networks. It is often the case that the data to be transmitted between two data endpoints is packaged according to specific data communications protocols to facilitate the transmission across the particular network in question. This packaging may include the addition of network management and other information such as headers and trailers to the data to facilitate transmission based upon the dictates of the particular protocol employed. Such packaging is generally termed "framing" in the art.

Some of these protocols may include, for example, data transmission using time division multiplexing (TDM) approaches such T1 and E1 standards known in the art. Other example standards may include high-level data link control (HDLC) or asynchronous transfer mode (ATM). Each of these protocols have their own applications and goals in terms of history, performance, error-immunity, flexibility, and other factors. Consequently, each of these protocols employ framing procedures by which data is packaged for transmission across the various networks employed. These protocols are generally incompatible and require translation or conversion to transmit data in a transmission link that employs two or more protocols in two or more different segments.

The conversion from one protocol to another requires specific framing technology to accomplish the task. With a myriad of standards between which conversion is possible, many different dedicated protocol conversion units have been developed to accomplish the specific conversion tasks presented. The typical protocol conversion unit is labeled "dedicated" above because such units generally employ dedicated circuits which are capable only of performing the conversion from one specific protocol to another. The result of this fact is a multitude of protocol conversion units on the market to accomplish the individual conversion tasks, thereby diminishing efficiencies to be obtained by mass production.

It is also the case that new communications standards are developed as data communication technology develops over time. Often times, a particular standard may be in flux while discussion ensues among those skilled in the art until agreement on concrete provisions articulating a standard is reached. Consequently, it is difficult to develop data communications technology that employs an up and coming standard until the standard is settled. In the competitive world of data communications technology production, it is desirable to produce products to meet these new standards as quickly as is possible after a standard is finalized so as to compete in the marketplace.

BRIEF SUMMARY OF THE INVENTION

In light of the foregoing, it is an objective of the present invention to provide for technology which can achieve data communications protocol conversions between any number of protocols to obtain the efficiencies of mass production and feature the flexibility allowing the unit to be quickly adapted to new data communications protocols as they develop.

In furtherance of these and other objectives, the present invention entails a system for providing a physical interface unit which is configured to receive a data stream which may use any one of a number of data communications protocols, and to transmit the same data stream using another one of the same number of data communications protocols. The physical interface unit is advantageously designed to operate in conjunction with a processor circuit to translate a data stream from a first data protocol to a second data protocol. The physical interface unit includes a first serial interface, a first asynchronous transfer mode (ATM) interface, and a first parallel interface. The physical interface also includes a second serial interface, a second ATM interface, and a second parallel interface. The first serial, ATM, and parallel interfaces are electrically coupled to a first FIFO circuit which interfaces with the processor circuit. Likewise, the second serial, ATM, and parallel interfaces are electrically coupled to a second FIFO circuit which interfaces with the processor circuit. One of the first serial, ATM, and parallel interfaces and one of the second serial, ATM, and parallel interfaces are enabled by a selection circuit. A bi-directional data stream using a first protocol is received from and transmitted to a first data endpoint by the enabled first interface and provided to the processor circuit for protocol translation. The same data stream is transmitted to and received from a second data endpoint from the processor circuit via the enabled second interface.

In accordance with another aspect of the present invention a method is provided for physically interfacing a data stream employing any one of a plurality of predetermined data communications protocols to a single processor. The method comprises the steps of selecting a first data communications protocol from a predetermined number of data communications protocols in a physical interface circuit of a data stream to be transmitted and received to and from a first data endpoint by the physical interface circuit, and selecting a second data communications protocol from a predetermined number of data communications protocols in a physical interface circuit of the data stream to be transmitted and received to and from a second data endpoint by the physical interface circuit. The method further comprises the steps of transmitting and receiving the data stream to and from the first data endpoint using the first data communications protocol, and finally, transmitting and receiving the data stream to and from the second data endpoint using the second data communications protocol.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
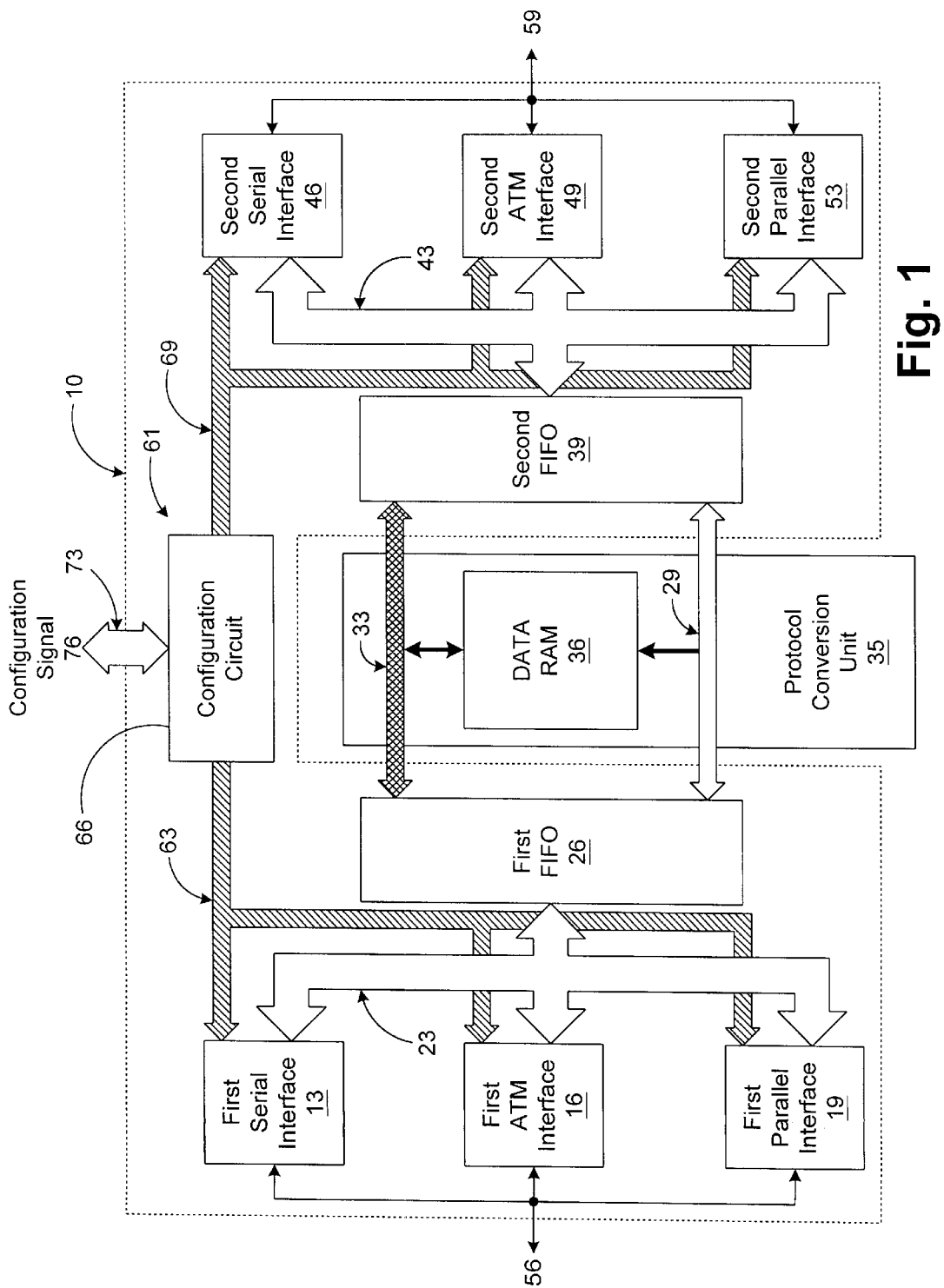
FIG. 1 is a block diagram of an interface unit employed with processor circuit to accomplish data communications protocol conversion.

Turning to FIG. 1, shown is a physical interface unit 10 according to an embodiment of the present invention. The physical interface unit 10 includes a first serial interface 13, a first asynchronous transfer mode (ATM) interface 16, and a first parallel interface 19. The first serial, first ATM, and first parallel interfaces 13, 16, and 19 facilitate bi-directional data communication and include an output port which is electrically coupled to a first common data bus 23. The first common data bus 23 is electrically coupled to an first first-in-first-out (FIFO) 26 which in turn is electrically coupled to a data bus 29 and a control/address bus 33 which are employed in a protocol conversion unit 35 which is described in later text.

A random access memory (RAM) 36 included in the protocol conversion unit 35 is shown electrically coupled to the data bus 29 and the control/address bus 33. It is understood that the RAM 36 is employed in the processor circuit which interfaces with the first FIFO 26 as is discussed in later text. Also, electrically coupled with the data bus 29 and the control/address bus 33 is a second FIFO 39. The second FIFO 39 in turn includes an output port that is coupled to a second common data bus 43. The second common data bus 43 is also coupled to the input ports of a second serial interface 46, a second ATM interface 49, and a second parallel interface 53, where the second serial interface 46, a second ATM interface 49, and a second parallel interface 53 each facilitates bi-directional data communication.

The first serial interface 13, first ATM interface 16, and the first parallel interface 19 each include an input port which is electrically coupled to a first communications channel 56 through which an input data signal is received from a first data endpoint (not shown). The first data endpoint may be, for example, a modem, data terminal equipment, or other data communications device. It is understood that the input ports of the first serial interface 13, first ATM interface 16, and the first parallel interface 19 may be electrically coupled in parallel to a common input point as shown, or to individual inputs.

Likewise, the second serial interface 46, second ATM interface 49, and the second parallel interface 53 each include an output port which is electrically coupled to a second communications channel 59 through which an output data signal is transmitted to a second data endpoint (not shown). The second data endpoint may be, for example, a modem, data terminal equipment, or other data communications device. It is further understood that the output ports of the second serial interface 46, second ATM interface 49, and the second parallel interface 53 may be electrically coupled in parallel to a common output point as shown, or to individual inputs.

In addition, the physical interface unit 10 includes a selection circuit 61 having a first configuration bus 63 which electrically couples a configuration circuit 66 to the first serial interface 13, first ATM interface 16, and the first parallel interface 19. The selection circuit 61 further includes a second configuration bus 69 which electrically couples the configuration circuit 66 to the second serial interface 46, second ATM interface 49, and the second parallel interface 53. The configuration circuit 66 is also electrically coupled to an external bus 73 from which a configuration signal 76 is received via an external processor circuit (not shown).

Figure 2:
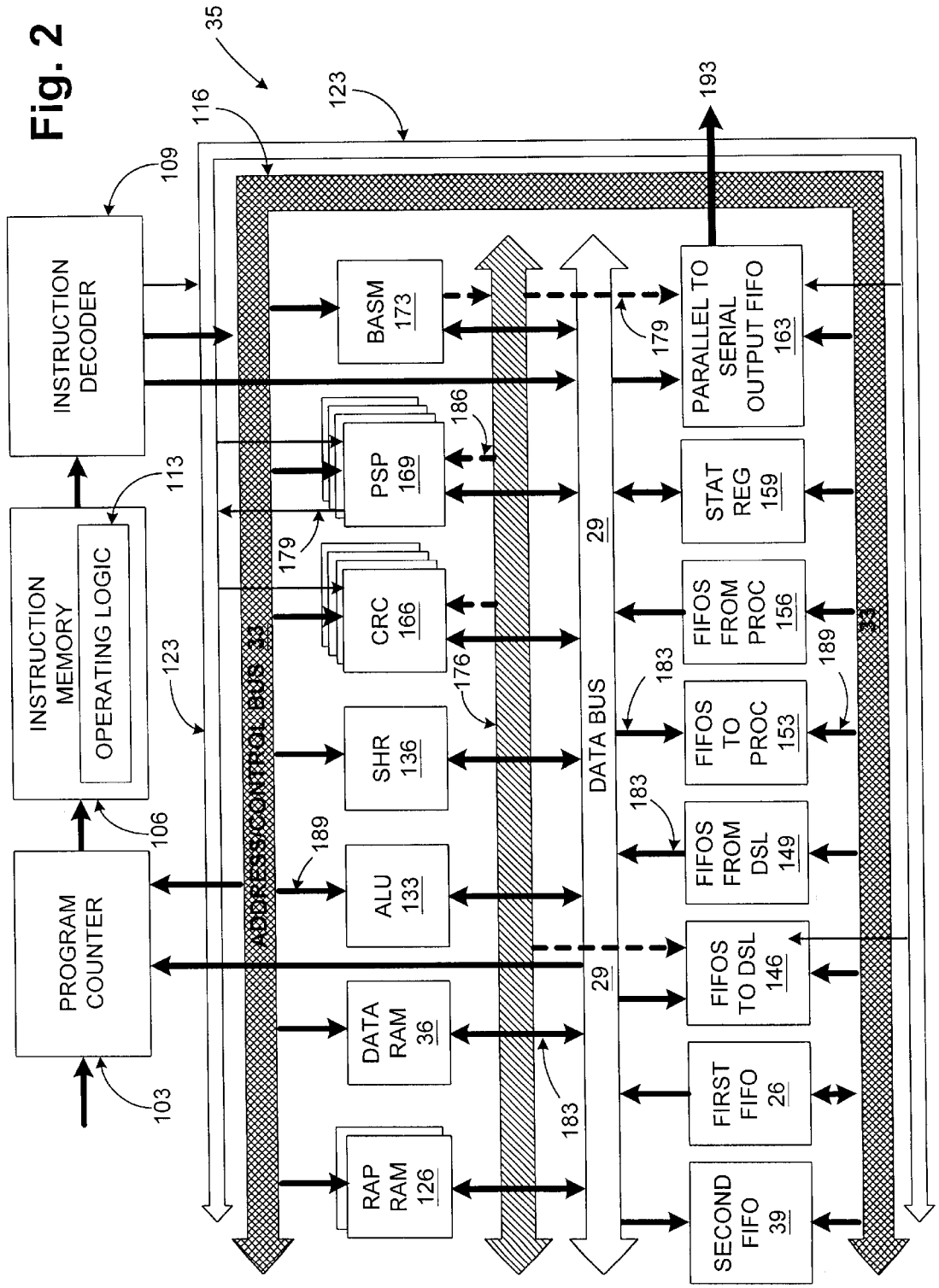
FIG. 2 is a block diagram of the processor circuit which interfaces with the physical interface unit of FIG. 1.

FIG. 2 is a block diagram of the protocol conversion unit of FIG. 1.

Next the operation of the physical interface unit 10 is described. Before operation, the physical interface unit 10 is configured to receive a data stream which was framed according to a specific data communications protocol. This is done by selecting one of the first serial interface 13, first ATM interface 16, or the first parallel interface 19 to receive the data stream transmitted from a first data endpoint. The selection is performed by alternatively enabling one of the first serial interface 13, first ATM interface 16, or the first parallel interface 19 using the selection circuit 61.

Similarly, the physical interface unit 10 is configured to transmit a data stream which is framed according to a second data communications protocol. This is done by selecting one of the second serial interface 46, second ATM interface 49, or the second parallel interface 53 to transmit the data stream to a second data endpoint. The selection is performed by alternatively enabling one of the second serial interface 46, second ATM interface 49, or the second parallel interface 53 using the selection circuit 61.

In particular, the configuration circuit 66 includes a first register with an output placed on the first configuration bus 63 and a second register with an output place on the second configuration bus 69. The configuration circuit 66 receives the configuration signal 76 via the external bus 73 which indicates the one of the first serial interface 13, first ATM interface 16, or the first parallel interface 19, as well as the one of the second serial interface 46, second ATM interface 49, and the second parallel interface 53 are to be activated. The configuration circuit 66 activates the appropriate one of the first serial interface 13, first ATM interface 16, or the first parallel interface 19 via the first configuration bus 63 and the appropriate one of the second serial interface 46, second ATM interface 49, and the second parallel interface 53 via the second configuration bus 69. Note that any parameters needed by each interface to operate such as timing or mode of operation is also communicated to the appropriate interface over the first and second configuration busses 63 and 69.

Once the input and the output of the physical interface unit 10 have been configured, then an input data stream is received by the one of the first serial interface 13, first ATM interface 16, or the first parallel interface 19 which communicates the data stream to the first FIFO 26 over the first common data bus 23. In the preferred embodiment, the first common data bus 23 facilitates parallel data communication using sixteen conductors. The input FIFO 26 acts as an input buffer to the protocol conversion unit 35. The first FIFO 26 is a parallel circuit that temporarily stores four sixteen bit words of data.

The data that is temporarily stored in the first FIFO 26 is then written to the data RAM 36. This is accomplished by an arbitrated write directly to the data RAM 36. In particular, the first FIFO 26 includes control circuitry with access to the data bus 29 and the control/address bus 33. The control circuitry also includes configuration registers which indicate the address in the data RAM 36 to which data is to be written. In order to perform the arbitrated write, the first FIFO 26 requests access to the data bus 29 via the control/address bus 33. The arbitration logic in the protocol conversion unit 35 grants access to the data bus 29 by the first FIFO 26 when available. The first FIFO 26 then writes the data to the data RAM 36 where it is accessed by the protocol conversion unit 35 and the predetermined protocol conversion is performed accordingly.

Once framed according to the output data communications protocol, the data is then written to the second FIFO 39 which acts as an output buffer. The second FIFO 39 in turn transmits the data onto the second common data bus 43 which is a sixteen conductor bus similar to the first common data bus 23. The data is then received by the one of the second serial interface 46, second ATM interface 49, or the second parallel interface 53 which in turn transmits the data to the second data endpoint.

The first serial interface 13 and the second serial interface 46 both operate as a standard synchronous serial interface which can be operated in a framed and unframed mode with multiple channels supported. The first ATM interface 16 and the second ATM interface 49 both operate according to the specifications promulgated by the ATM Forum Technical Committee for Utopia Level 2, v1.0, af-phy-0039.000, dated June 1995. The first parallel interface 19 and the second parallel interface 53 are of the type used for communicating with a processor or similar device over a data bus, etc.

Referring then, to FIG. 2, shown is a protocol conversion unit 35 which is use in conjunction with the physical interface unit 10. The protocol conversion unit 35 includes a program counter 103 electrically coupled to an instruction memory 106 which, in turn, is electrically coupled to an instruction decoder 109. Stored on the instruction memory 106 is operation logic 113. The program counter 103 is electrically coupled to the address/control bus 33 and the data bus 29, thereby allowing data to be read into the program counter 103 from the address/control bus 33 and the data bus 29. The instruction decoder 109 is also electrically coupled to the address/control bus 33 and the data bus 29 thereby allowing data to be written from the instruction decoder 109 to the address/control bus 33 and the data bus 29. The data bus 29 is comprised of, for example, eight parallel conductors.

The protocol conversion unit 35 also includes a bit bus 123 which is comprised of two conductors. Although shown separately, in the preferred embodiment the two conductors of the bit bus 123 is actually included with the address/control bus 33, however, the bit bus 123 is shown separately herein for greater clarity as to its functionality. The instruction decoder 109 is electrically coupled to the bit bus 123.

The address/control bus 33, data bus 29, and the bit bus 123 are electrically coupled to the various data handling blocks which include various task specific logical circuits within the protocol conversion unit 35. Generally the data handling blocks all read control and address data from the address/control bus 33 and can both read and write data to the data bus 29, although some of the data handling blocks can perform either read only or write only to the data bus 29, depending upon the function of the particular data block. The data handling blocks include a random access pointer random access memory (RAP RAM) 126, the RAM 36 also known as a scratch RAM, an arithmetic logic unit (ALU) 133, and a shift register 136. Note that the RAP RAM 126 is actually two redundant RAP RAMS 126 as shown by the layered appearance in FIG. 2.

The data handling blocks also include a number of first in, first out registers (FIFO's) to facilitate the reception and transmission of data. Specifically, the FIFO's include the second FIFO 39, the first FIFO 26, a digital subscriber line (DSL) output FIFO 146, a DSL input FIFO 149, a processor output FIFO 153, and a processor input FIFO 156. The data handling blocks further include a status register 159 and a parallel-to-serial output FIFO 163. Note the first and second FIFO's 26 and 39 are those included in the physical interface unit 10, shown here for clarity.

The protocol conversion unit (PCU) 35 also features task specific logical circuits which include a cyclic redundancy check (CRC) generator 166, a parallel-to-serial-to-parallel (PSP) converter 169, and a bit-assembly register (BASM) 173. Both the CRC generator 166 and the PSP circuit 169 are represented by four layers which show four redundant circuits. The PCU 35 further comprises a shadow bus 176 which interfaces with predefined data handling blocks as will be discussed.

Specific data handling blocks are electrically coupled to the bit bus 123, the address/control bus 33, the data bus 29, and the shadow bus 176 in order to execute bit transfers 179, full parallel transfers 183, or shadow transfers 186. Note control/address information 189 is transmitted to each data handling block as shown. The parallel-to-serial output FIFO 163 also includes a serial output 193.

The protocol conversion unit 35 is specifically programmed to convert the data communications protocol of an input data stream into an output data stream framed according to an output data communications protocol. In order to accomplish this task, the protocol conversion unit 35 features task specific circuits as previously mentioned. A more detailed description of the operation of the protocol conversion unit 35 is offered in the related U.S. patent application entitled "System and Method for Protocol Conversion in a Communications System", filed on even data herewith, and assigned Ser. No. 09/164,969, the entire text of which is incorporated herein by reference.

In addition, the operation of the cyclic redundancy check (CRC) generator 166 is described in the related U.S. patent applications entitled "System and Method for Generating Error Checking Data in a Communications System", filed on even data herewith, and assigned Ser. No. 09/164,921, the entire text of which is incorporated herein by reference. The operation of the parallel-to-serial-to-parallel (PSP) converter 169 is described in the related United States Patent Applications entitled "System and Method for Data Alignment in a Communications System", filed on even data herewith, and assigned Ser. No. 09/164,329, the entire text of which is incorporated herein by reference. Finally, the operation of the bit-assembly register (BASM) 173 is described in the related U.S. patent applications entitled "Circuit and Method for Performing Partial Parallel Data Transfer in a Communications System", filed on even data herewith, and assigned Ser. No. 09/164,850, the entire text of which is incorporated herein by reference.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A multiple data communications protocol physical interface unit, comprising:
   a first serial interface and a second serial interface;
   a first asynchronous transfer mode (ATM) interface and a second ATM interface;
   a first parallel interface an a second parallel interface; and
   a selection circuit configured to alternatively enable one of the first serial, ATM, and parallel interfaces, and, one of the second serial, ATM, and parallel interfaces.

2. The physical interface unit of claim 1, wherein
   a first configuration bus electrically coupling the first serial, ATM, and parallel interfaces to a configuration circuit; and
   a second configuration bus electrically coupling the second serial, ATM, and parallel interfaces to the configuration circuit.

3. The physical interface unit of claim 1, further comprising:
   a first first-in-first-out (FIFO) circuit being electrically coupled to the first serial, ATM, and parallel interfaces via a first common data bus; and
   a second FIFO circuit being electrically coupled to the second serial, ATM, and parallel interfaces via a second common data bus, wherein the first and second FIFO circuits interface with a processor circuit via a processor data bus.

4. A multiple data communications protocol physical interface unit, comprising:
   first means for transmitting and receiving a data stream to and from a first data endpoint, the first means being configurable to facilitate multiple data communications protocols, the multiple data communications protocols including a parallel protocol, a serial protocol, and an asynchronous transfer mode (ATM) protocol, the first means further comprising:
      serial means for transmitting and receiving a serial data stream, the serial means having a first output coupled to a common data bus;
      asynchronous transfer mode (ATM) means for transmitting and receiving an ATM data stream, the ATM means having a second output coupled to the common data bus;
      parallel means for transmitting and receiving a parallel data stream, the parallel means having a third output coupled to the common data bus; and
      selection means for alternatively enabling one of the serial, ATM, and parallel means; and
   second means for transmitting and receiving the data stream to and from a second data endpoint, the means being configurable to facilitate multiple data communications protocols, the multiple data communications protocols including a parallel protocol, a serial protocol, and an asynchronous transfer mode (ATM) protocol.

5. The physical interface unit of claim 4, wherein the first means further comprises:
   buffer means for interfacing the common data bus with a data bus in a processor circuit, the data bus being linked to a data memory, wherein the serial, ATM and parallel means are configured to transmit a uniform data stream to the buffer means when enabled, the buffer means providing temporary storage of at least one word of the uniform data stream; and
   arbitration means for writing the word of the uniform data stream to the data memory.

6. A multiple data communications protocol physical interface unit, comprising:
   first means for transmitting and receiving a data stream to and from a first data endpoint, the first means being configurable to facilitate multiple data communications protocols, the multiple data communications protocols including a parallel protocol, a serial protocol, and an asynchronous transfer mode (ATM) protocol; and
   second means for transmitting and receiving the data stream to and from a second data endpoint, the means being configurable to facilitate multiple data communications protocols, the multiple data communications protocols including a parallel protocol, a serial protocol, and an asynchronous transfer mode (ATM) protocol, the second means further comprising:
      serial means for transmitting and receiving a serial data stream, the serial means having a first output coupled to a common data bus;
      asynchronous transfer mode (ATM) means for transmitting and receiving an ATM data stream, the ATM means having a second output coupled to the common data bus;
      parallel means for transmitting and receiving a parallel data stream, the parallel means having a third output coupled to the common data bus; and
      selection means for alternatively enabling one of the serial, ATM, and parallel means.

7. The physical interface unit of claim 6, wherein the second means further comprises a buffer means for interfacing a data bus in a processor circuit with the common data bus, wherein the serial, ATM, and parallel means are configured to receive a uniform data stream from the buffer means when enabled, the buffer means providing temporary storage of at least one word of the uniform data stream.

* * * * *